United States Patent [19]

Bessette et al.

[11] 4,167,023
[45] Sep. 4, 1979

[54] ROTATING HEAD RECORDER WITH DIFFERENT RECORDING AND PLAYBACK SPEEDS

[75] Inventors: Oliver E. Bessette, Stratford; James S. Griffin, Burlington, both of N.J.

[73] Assignee: RCA Corporation, New York, N.Y.

[21] Appl. No.: 852,448

[22] Filed: Nov. 17, 1977

Related U.S. Application Data

[63] Continuation of Ser. No. 694,377, Jun. 9, 1976, abandoned.

[51] Int. Cl.² .............................................. H04N 5/76
[52] U.S. Cl. ........................................ 358/127; 360/9; 360/77; 360/70; 360/109; 360/84
[58] Field of Search ................... 360/10, 33, 8, 9, 77, 360/73, 75, 70, 109, 76, 84, 85; 348/127, 288

[56] References Cited

U.S. PATENT DOCUMENTS

| | | | |
|---|---|---|---|
| 3,157,738 | 11/1964 | Okamura | 360/9 |
| 3,170,031 | 2/1965 | Okamura | 360/9 |
| 3,294,902 | 12/1966 | Maxey | 360/10 |
| 3,573,361 | 4/1971 | Narita | 360/10 |
| 3,995,317 | 11/1976 | Schmidt | 360/109 |
| 4,001,885 | 1/1977 | Ikushima | 360/70 |

*Primary Examiner*—Bernard Konick
*Assistant Examiner*—Alan Faber
*Attorney, Agent, or Firm*—Samuel Cohen; Carl V. Olson

[57] ABSTRACT

A recording and reproducing system capable of recording at one speed and playback at another speed includes a capstan linear drive for a tape, and a headwheel drive means to drive heads in a transverse direction over the tape. Recording and/or playback is accomplished at any speed within a first given two-to-one speed range by operating the capstan linear drive at a corresponding speed, and by operating the headwheel at a speed which has a first given constant ratio with the linear speed. Recording and/or playback is accomplished over a second different adjacent two-to-one speed range by operating with the capstan linear drive at a corresponding proportional speed, with the headwheel at a speed which has a second different constant ratio with the linear speed, and with the rotating headwheel physically tilted by a given small angle relative to the transverse direction.

3 Claims, 8 Drawing Figures

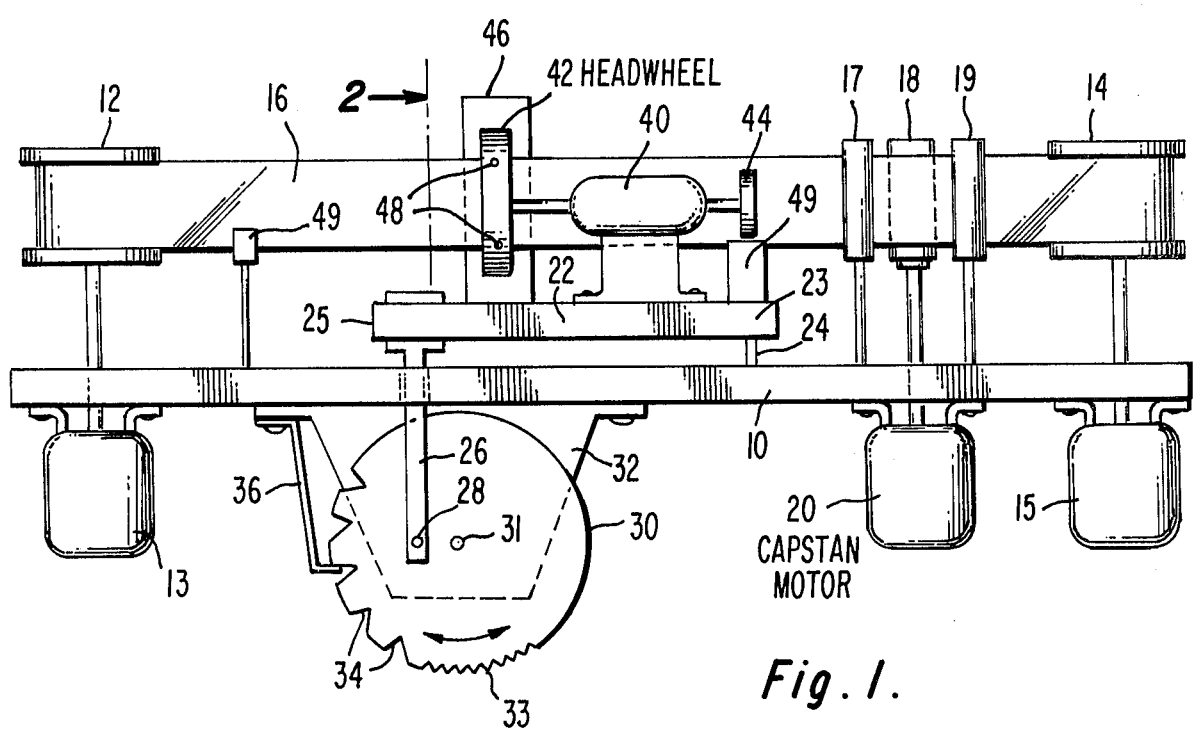
Fig. 1.
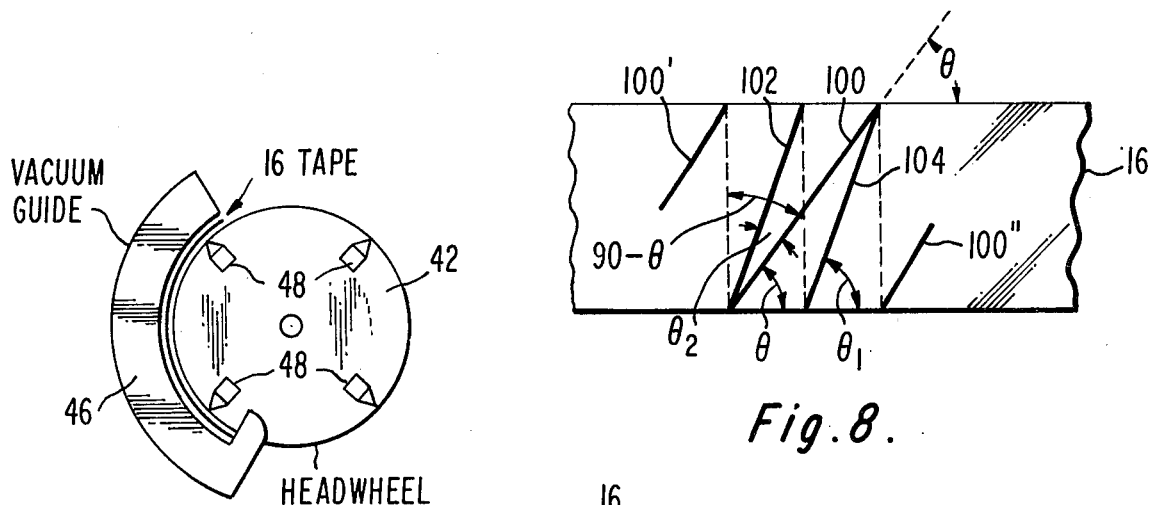
Fig. 2.
Fig. 8.
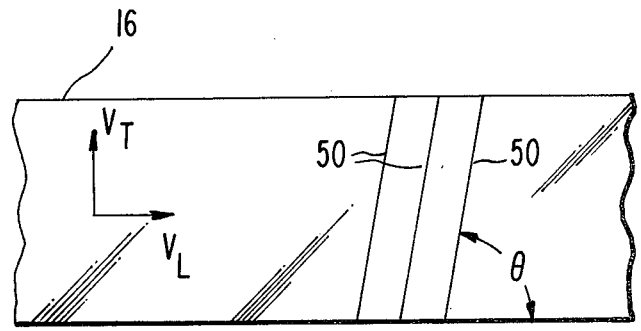
$$\text{TAN } \theta = \frac{V_T \text{ IN/SEC.}}{V_L \text{ IN/SEC}}$$
Fig. 3.

| REGION | HEADWHEEL TILT ANGLE |
|---|---|
| N=1 | 90.0000° |
| N=2 | 89.8298° |
| N=3 | 89.7447° |
| N=4 | 89.7022° |
| N=5 | 89.6809° |
| N=6 | 89.6683° |

… 1

ROTATING HEAD RECORDER WITH DIFFERENT RECORDING AND PLAYBACK SPEEDS

This is a continuation, of application Ser. No. 694,377, filed June 9, 1976, now abandoned.

BACKGROUND OF THE INVENTION

A magnetic recording system widely used for recording television video and audio signals and used also for digital signals, is called the quadraplex system and it involves a magnetic tape about two inches wide which is driven past a transversely rotating headwheel carrying four equally-spaced magnetic heads. The heads move across the tape at right angles with the direction of linear movement of the tape, and each recorded track or path on the tape is at an angle $\theta$ on the tape with the direction of linear movement of the tape. The angle $\theta$ depends on the speed each head goes transversely across the tape relative to the linear speed of the tape. The transverse and linear speeds used for recording are used also for playback to insure that the heads will follow the recorded tracks at the angle $\theta$.

It is sometimes very desirable, particularly with digital signals, to be able to record the signals at one speed and play back the signals at another higher or lower speed.

SUMMARY OF THE INVENTION

A rotating head recording system in which recording and playback can be at different speeds over a limited range of speeds, such as two-to-one, by maintaining a constant ratio between the transverse speed of the heads and the linear speed of the tape. Recording and playback can be at different speeds over a large range of speeds by changing the ratio of transverse to linear speeds, and slightly altering the angle the headwheel makes with the linear direction of the tape.

BRIEF DESCRIPTION OF THE DRAWING

FIG. 1 is an elevation of a rotating head recorder constructed according to the teachings of the invention;

FIG. 2 is a view looking in the direction 2 at the headwheel in the recorder of FIG. 1;

FIG. 3 is a diagram illustrating the effect of transverse head speed and linear tape speed on the angle $\theta$ of the tracks on the recording tape;

FIG. 8 is a diagram which will be referred to in describing the reason for tilting the headwheel when recording or playing back at certain data rates.

DESCRIPTION OF THE PREFERRED EMBODIMENT

Figure 4:
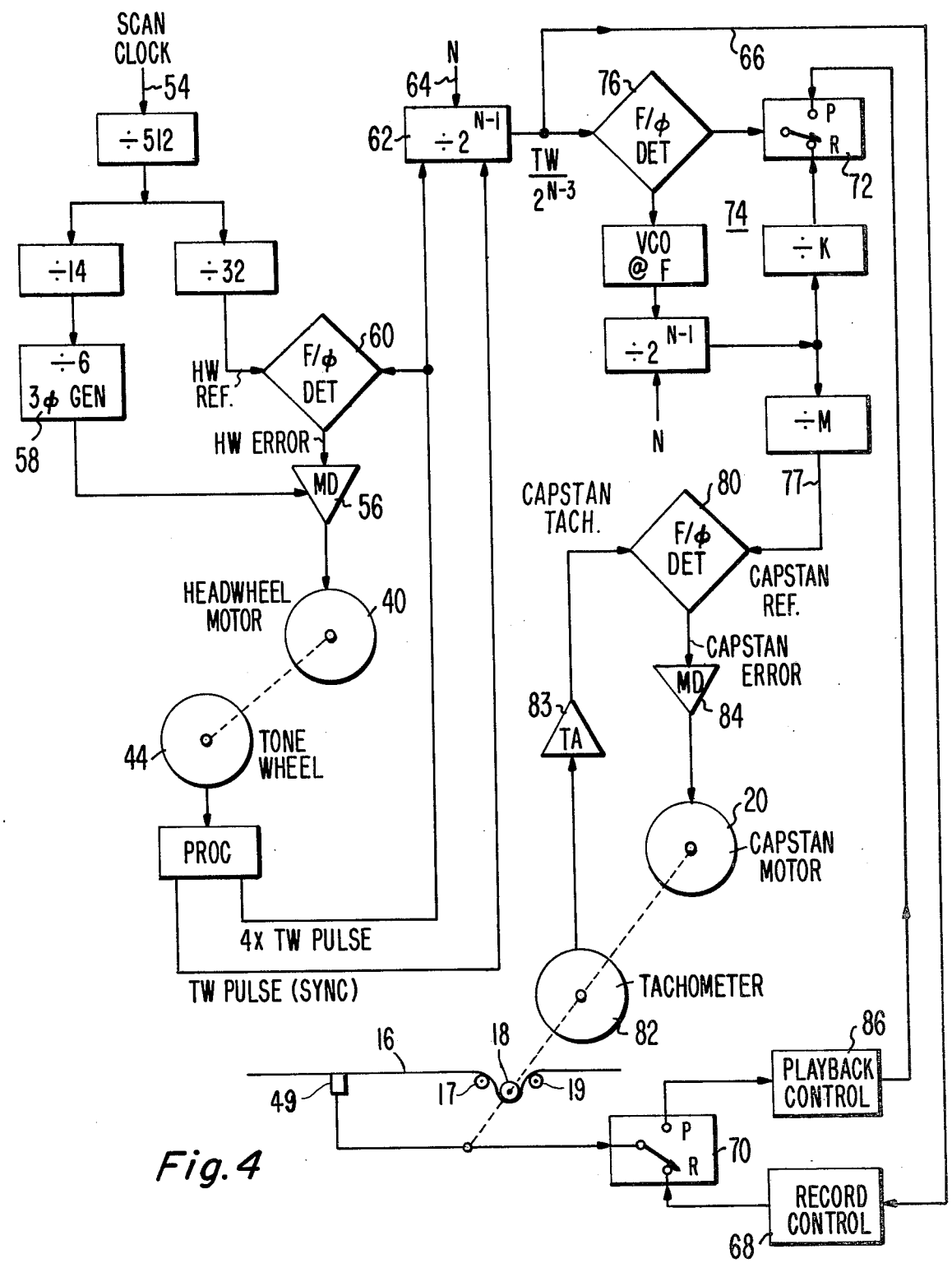
FIG. 4 is a block diagram of a servo system for controlling the speed of the headwheel and the speed of the recording tape in the apparatus of FIG. 1.

Referring now in greater detail to FIGS. 1 and 2, the rotating head type recording apparatus shown includes a base 10 supporting a magnetic tape supply reel 12 and motor 13, and a tape take-up reel 14 and motor 15. A magnetic tape 16 extending between reels 12 and 14 is about two inches wide and is driven by a capstan 18 between idler rollers 17 and 19. The capstan 18 is driven by a capstan motor 20.

A headwheel platform 22 has an end 23 mounted at 24 a fixed distance above the base 10. The other end 25 of the platform 22 is connected by a link 26 to an eccentric connection 28 on an adjusting wheel 30. The wheel 30 is rotatably mounted at 31 on a bracket 32. The wheel 30 has a knurled edge at 33 to facilitate its manual rotation for the purpose of moving the link 26 to cause the end 25 of platform 22 to pivot about its end 23 fixed to the base 10. The periphery of wheel 30 is provided with notches 34 for engagement by the end of a spring-loaded pawl 36 to provide detents for six predetermined positions of the wheel 30 and the platform 22.

The platform 22 carries a headwheel motor 40 having a headwheel 42 on one end of the motor shaft, and having a tone wheel 44 on the other end of the motor shaft. A vacuum tape guide 46 is positioned on the side of the magnetic tape 16 opposite from the headwheel 42 to give the tape an arcuate shape corresponding with the peripheral surface of the headwheel. The headwheel carries four magnetic heads 48 which scan across the magnetic tape in a direction at right angles to the direction of linear tape motion. The tonewheel 44 cooperates with a fixed pick-up 47 in a usual manner to constitute a tachometer providing a signal indicative of the speed of rotation of the headwheel 42.

A control magnetic head 49 is positioned at one edge of the magnetic tape 16 for the purpose of recording and playback of a tape servo control signal for insuring in-phase registration of transverse scans over recorded tracks during data playback.

FIG. 3 shows magnetic tracks 50 made on a tape 16 by the combined rotation of the headwheel 42 and the capstan 18. The tracks 50 make an angle $\theta$ with the linear direction of motion of the tape. The angle $\theta$ is determined by the ratio of the transverse speed $V_T$ of the heads across the tape and the linear speed $V_L$ of the tape. The heads must follow paths 50 on playback at exactly the same angle $\theta$ as the paths followed during recording. This condition is satisfied by the present invention apparatus even though the playback speed is greatly different from the recording speed.

FIG. 4 shows a servo system for maintaining the headwheel motor 40 and the capstan motor 20 at speeds necessary for recording at a desired data rate and for playback of the recorded data at a desired data rate. Operation at a desired data rate, whether for recording or reproducing, is determined by a scan clock oscillator (not shown) having a frequency variable between 20 and 10 MHz.

Figures 5, 6:
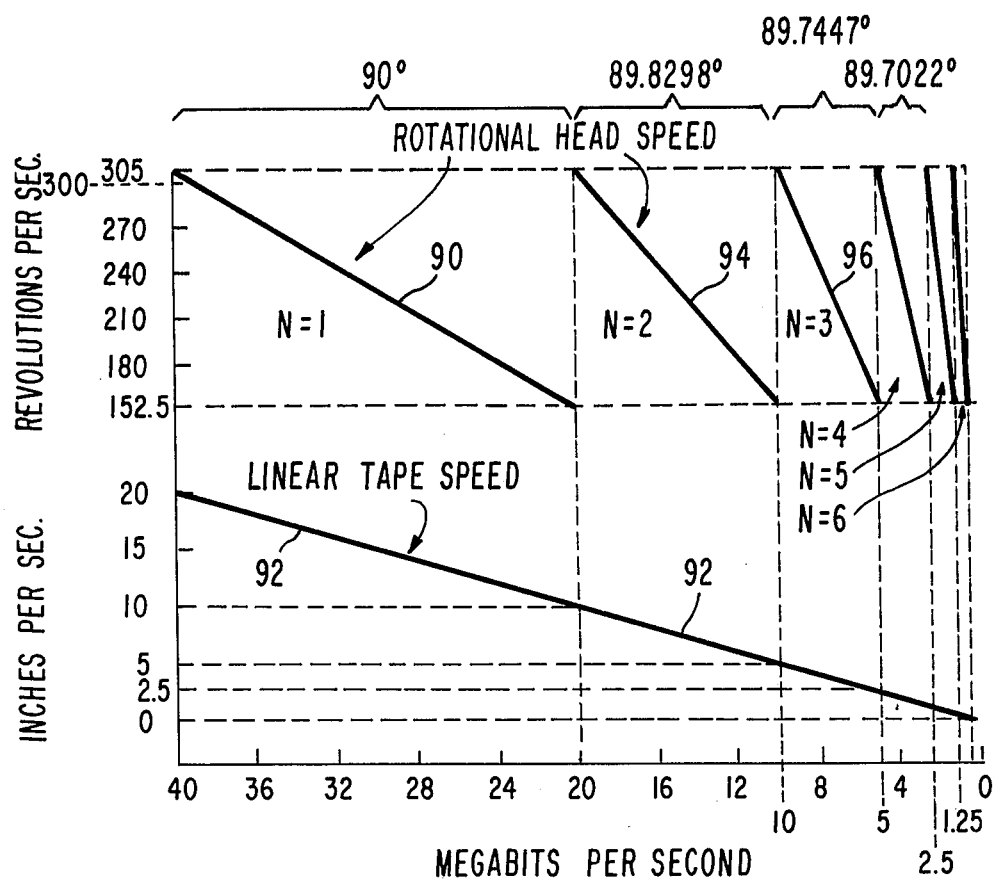
FIG. 5 is a chart from which one can select the conditions for recording signals at any desired speed, and select the conditions for playback of the signals at any other desired speed.
FIG. 6 is a tabulation of headwheel tilt angles for the six regions in the chart of FIG. 5.

The scan clock signal at 54 simply may be manually set to a frequency between 10 and 20 MHz which is proportional to the known rate of the data to be recorded or reproduced. Alternatively, the scan clock signal frequency can be derived automatically from the data to be recorded by known means such as is described in U.S. Pat. No. 3,294,902 issued on Dec. 27, 1966, to A. R. Maxey. The Table I below shows three examplary data rates, the corresponding scan clock frequency settings and the resulting tape speeds and head speeds, as illustrated in FIG. 5 when N=1.

TABLE I

| Data Rate Megabits/sec | Scan Clock MHz | Tape Speed inches/sec | Head Speed rev./sec |
|---|---|---|---|
| 20 | 10 | 10 | 152.50 |
| 30 | 15 | 15 | 228.75 |
| 40 | 20 | 20 | 305.00 |

The scan clock signal is applied at 54 to a known sub-synchronous power servo drive for three phase motor operation of the headwheel motor 40. The headwheel motor 40 is driven by a motor driver 56 which is supplied with three-phase power from a generator 58 producing frequency which causes the motor to rotate at a rate about 50 percent higher than the desired rate. A frequency and phase detector 60 supplies an error signal to the motor driver 56 to cause the motor to rotate at the desired speed. The frequency and phase detector generates the error signal by comparing a reference frequency signal divided down from the scan clock frequency with a frequency derived from the tonewheel 44 and representing the actual speed of the headwheel. The headwheel is thus made to rotate at a speed directly proportional to the scan clock signal applied at 54.

The right-hand side of FIG. 4 shows a servo system for maintaining the speed of the capstan motor 20 at a constant, but adjustable, ratio with the speed of the headwheel motor 40. The headwheel motor speed indicated by the frequency signal from the tonewheel 44 is applied to an adjustable divider 62 which divides the frequency by $2^{N-1} = 1, 2, 4, 8, 16$ or 32 in dependence on an N input at 64 of 1,2,3,4,5, or 6, respectively. The six values N represent six regions of operation which will be described in connection with FIG. 5. Each successive region has a transverse/linear speed ratio double that of the preceding region.

The capstan servo system on the right-hand side of FIG. 4 also includes means operative during recording to record a control track along one edge of the tape 16 and means operative during playback to insure that the magnetic heads will sweep paths phased with the recorded transverse tracks, rather than between the recorded tracks. For this purpose, the tonewheel frequency signal divided by $2^{N-3}$ from divider 62 is applied over line 66 to a control track recording circuit 68 and through a switch 70 to the control head 49 on the tape 16. This causes the recording of a capstan servo control signal appropriate to the operating region N which marks the positions of the transverse scan tracks on the tape 16.

During this time that data and a servo control signal are recorded on the tape 16, a switch 72 completes a loop 74 from and to a frequency and phase detector 76, whereby to produce at 77 a capstan reference frequency having a desired subharmonic or harmonic relationship with the tonewheel frequency representing headwheel speed. The capstan reference frequency at 77 is applied to a frequency and phase detector 80 which also receives a signal from a capstan tachometer 82 via a tachometer amplifier 83. The capstan error signal produced by frequency and phase detector 80 is applied to a motor driver 84 which supplies electric power to the capstan motor 20. The capstan 20 is driven at a speed such that the linear speed of the magnetic tape bears a fixed ratio (determined by operating region N) with the transverse speed of heads across the tape 16.

When it is desired to play back the data recorded on the tape, the switches 70 and 72 are placed in their playback positions P. Then the servo control signal recorded on an edge of the tape is read from head 49 through switch 70 to a playback servo control circuit 86, from which a signal is applied through switch 72 to one input of frequency and phase detector 76. The error output of detector 76 is translated in frequency to a capstan reference signal at 77 which is applied to the frequency and phase detector 80 where it is compared with the capstan tachometer signal. The capstan error signal from detector 80 is applied through motor driver 84 to the capstan motor. The capstan motor is driven at a speed such that the linear speed of the magnetic tape bears a fixed ratio (determined by the operating region N) with the transverse speed of heads across the tape 16, and the transverse scans are positionally phased in registration along the linear dimension of the tape with the previously recorded tracks.

FIG. 5 shows the operating conditions of the described illustrative apparatus for a range of recording and playback speeds from 40 megabits per second to 0.625 megabits per second. At the highest data rate of 40 megabits per second, the headwheel is operated at 305 revolutions per second (a point on the head speed curve 90), the capstan is operated to provide a linear tape speed of 20 inches (50.8 cm) per second (a point on the linear tape speed curve 92), and the headwheel 42 is positioned by adjusting wheel 30 so that the headwheel rotates in a plane which is at exactly 90 degrees with the direction of linear movement of the tape 16. Under these conditions, the relative speeds of the transverse and linear motions cause the heads on the headwheel 42 to sweep paths 50 shown in FIG. 7a at an angle $\theta$ with the linear dimension of the tape 16. Data recorded under these speed conditions can, of course, be played back under the same speed conditions.

Figure 7:
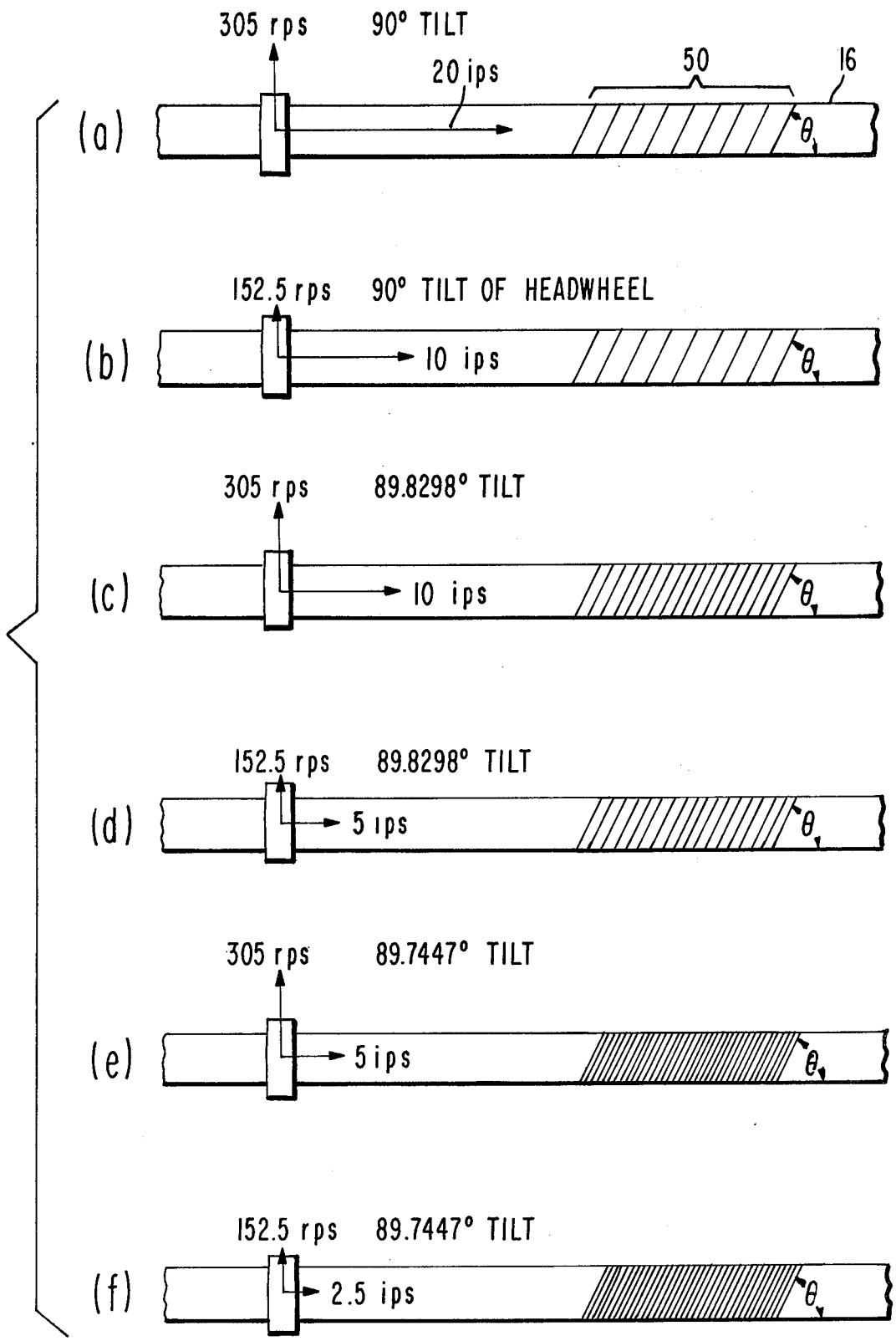
FIG. 7, consisting of (a)–(f), is a series of charts which will be referred to in describing the operation of the apparatus in FIG. 1 when operated to record signals at a given high speed, and to playback the recorded signals at selected slower speeds.

If the data recorded at 40 megabits per second is desired to be played back at half speed, at 20 Mb/s, the speed of the headwheel is halved to 152.5 rps, and the linear speed of the tape is halved to 10 ips. The paths followed on the tape by the heads are at exactly the same angle $\theta$ during playback (FIG. 7b) as during recording (FIG. 7a). It is also true as indicated on FIG. 5, that data recorded at any speed between 40 and 20 Mb/s can be played back at any other speed between 40 and 20 Mb/s. It is merely necessary to maintain a constant ratio between the headwheel speed (curve 90) and the capstan speed (curve 92), i.e., the transverse speed $V_T$ and the linear speed $V_L$. The speeds at which recording and playback are performed are determined by proportional frequencies of scan clock signals applied at 54 to the servo system of FIG. 4, and the constant ratio between headwheel and capstan speeds is maintained by the servo system so long as an N=1 signal is applied to the servo system.

Playback as described can be at any speed down to about one-half of the recording speed before the speed of the heads over the magnetic tape surface gets so slow that the induced voltage equal to $d\phi/dt$ is too low to reliably reproduce the stored information. If the difference between recording and playback speeds is greater than a two-to-one ratio, playback can be accomplished by appropriately reducing the linear tape speed (curve 90) while maintaining the headwheel speed sufficiently high (curve 94) to pick up the recorded information and be at a speed which produces two transverse scans of the tape for every one recorded scan. For example, referring to FIG. 5, data recorded at 40 Mb/s can be played back at 20 Mb/s by using a headwheel speed of 305 rps and a linear tape speed of 10 ips, and an input N=2 to the servo system of FIG. 4. Then, as shown in FIG. 7c, there are two playback scans per recording scan, and the angle $\theta$ remains substantially the same as during recording. The angle $\theta$ is made exactly the same as during recording by tilting the plane of the headwheel from 90 degrees to 89.6594 degrees relative to the direction of linear tape motion. This is done by turning the adjusting wheel 30 to a next adjacent detent position.

In addition to the playback described at 20 Mb/s, the recorded information can be played back at any rate from 20 Mb/s to 10 Mb/s by merely changing the input scan clock signal applied to at 54 in FIG. 4 so that the head speed 94 and tape speed 92 have values corresponding with the desired data rate in Mb/s. At a data rate of 10 Mb/s the conditions are as shown in FIG. 7d.

If an even greater reduction in playback speed is desired to a rate between 10 Mb/s and 5 Mb/s, the scan clock signal is changed to a value producing speeds along curves 96 and 92 corresponding with the desired data rate, the signal N is changed to N=3, and the headwheel tilt angle is changed to 89.4892 degrees. FIGS. 7e and 7f show two examples at the ends of this third data speed range. In this case there are four ($2^{N-1}$) playback scan lines for each record scan line. Solely, the signal pickup during the one playback scan going over the recording track is utilized. In a similar manner, even lower playback rates can be obtained at speeds where N=4, N=5, and N=6. FIG. 6 tabulates the headwheel tilt angles employed in each of the six speed regions N=1 through N=6.

Recording may be at any data rate shown in FIG. 5, and playback also may be at any data rate shown. The headwheel tilt angle used during recording and during playback must be set to a value appropriate to the rate at which data is recorded or played back as indicated in FIG. 5. The various headwheel tilt angles differ by very small amounts, but the use of an indicated tilt angle in the exemplary apparatus is necessary for optimum operation of the apparatus at very high information packing density.

For an explanation of the reason why headwheel tilt angles are important, reference is made to FIG. 8 where line 100 represents a recording scan line across the magnetic tape 16 at an angle $\theta$. If the headwheel speed is doubled so that two scan lines are used during playback without any change in the linear tape speed, the two playback scan lines may be as shown by lines 102 and 104, which are necessarily at an angle $\theta_1$ different from $\theta$. To make the playback scan line occur at the same angle $\theta$ as the recorded tracks, it is necessary to tilt the headwheel an amount $\theta_2$ which is approximately equal to one-half of the angle $90-\theta$. When this is done, one of the two playback scans can be made to exactly follow the one recorded track. The signal picked up during the one registered playback scan is selected to the exclusion of signals occurring during the unregistered playback scan by appropriate utilization electronic apparatus not shown.

While recording at a high data rate and playback at a low data rate has been described, it will be understood also that recording can be at a low data rate with playback at a high data rate. It will also be understood that the data rates, headwheel speeds, number of heads per headwheel, capstan speeds, speed ratios, and tilt angles herein described are given solely by way of example, and that other suitable values may be selected and employed by those skilled in the art.

What is claimed is:

1. A recording and reproducing system capable of recording data at any data rate within a wide continuous range including a plurality of N successive 2-to-1 sub ranges, and playback at any data rate within the same wide continuous range, comprising:

linear drive means to drive an elongated recording medium in a linear direction at any selected speed in a continuous range including a plurality of N successive 2-to-1 sub ranges, transverse drive means to drive heads on a rotating headwheel over the recording medium in a transverse direction at any selected transverse speed in one 2-to-1 speed range, speed control means responsive to a speed control signal for any data rate within a first given sub range where N equals 1 to operate said linear drive means at a corresponding speed, and to operate said transverse drive means at a speed which has a constant ratio K with the linear speed, whereby at all speeds in said first given sub range each head follows a path across said medium having the same angle $\theta$ with the direction of linear motion of the medium, said speed control means being responsive to a speed control signal for a data rate within a second different sub range of speeds where N is equal to 2 to operated said linear drive means at a corresponding speed proportional to the data rate, and to operate said transverse drive means at a speed which has a constant ratio 2K with the linear speed, and means operated before recording or reproducing at a data rate in said second sub range to physically tilt the plane of said rotating headwheel through a given angle relative to the transverse direction to a position such that at speeds in said second different sub range each head continues to follow a path across said medium at said angle $\theta$ with the direction of linear motion of the medium.

2. A system as defined in claim 1 wherein said given angle is substantially equal to one-half of the angle $90-\theta$.

3. A recording and reproducing system capable of recording data at any data rate within a continuous range including N 2-to-1 sub ranges, and playback at any data rate within the same continuous range, linear drive means to drive an elongated recording medium in a linear direction, transverse drive means to drive heads on a rotating headwheel over the recording medium in a transverse direction, means to adjust the plane of rotation of said headwheel to N progressively slightly different predetermined transverse tilt angles corresponding respectively with said N sub ranges, so that each head always follows a path across said medium having the same angle $\theta$ with the direction of linear motion of the medium, and speed control means responsive to a speed control signal for any selected data rate within the continuous range to operate said linear drive means at a corresponding speed, and to operate said transverse drive means at a speed having a ratio NK with said linear speed, where K is a constant and N is the sub range of the selected data rate.

* * * * *